US006945508B2

(12) United States Patent
Lewis et al.

(10) Patent No.: US 6,945,508 B2
(45) Date of Patent: Sep. 20, 2005

(54) ELECTROMAGNETIC CONTROL VALVE

(75) Inventors: Stephen R. Lewis, Minonk, IL (US); Dana R. Coldren, Fairbury, IL (US); Harish K. Krishnaswamy, Normal, IL (US); Sudhindra K. Ayanji, Peoria, IL (US); Jeremy T. Claus, Pontiac, IL (US)

(73) Assignee: Caterpillar Inc., Peoria, IL (US)

(*) Notice: Subject to any disclaimer, the term of this patent is extended or adjusted under 35 U.S.C. 154(b) by 175 days.

(21) Appl. No.: 10/446,934

(22) Filed: May 29, 2003

(65) Prior Publication Data

US 2004/0238774 A1 Dec. 2, 2004

(51) Int. Cl.[7] .................................................. F16K 31/02
(52) U.S. Cl. ............................... 251/129.02; 251/129.19
(58) Field of Search ....................... 251/129.02, 129.19, 251/321, 337

(56) References Cited

U.S. PATENT DOCUMENTS 4,717,118 A * 1/1988 Potter .................... 251/129.02
4,869,462 A * 9/1989 Logie et al. ........... 251/129.16
5,118,076 A * 6/1992 Homes .................. 251/129.02
6,021,963 A 2/2000 Coldren et al.
6,029,682 A 2/2000 Lewis et al.
6,349,739 B1 2/2002 Burgoni et al.

* cited by examiner

*Primary Examiner*—Edward K. Look
*Assistant Examiner*—John K. Fristoe, Jr.
(74) *Attorney, Agent, or Firm*—Finnegan, Henderson, Farabow, Garrett & Dunner LLP

(57) ABSTRACT

An electromagnetic control valve is provided. The control valve includes a housing defining a bore and a fluid passageway having a seat. A valve element is slidably disposed in the bore and is moveable between a first position where a flow of fluid passes by the seat and a second position where a flow of fluid relative to the seat is blocked. A solenoid having an armature is operatively connected with the valve element. The solenoid is operable to move the valve element from the first position to the second position. A biasing assembly is operatively engaged with the valve element and is adapted to move the valve element from the second position towards the first position. The biasing assembly exerts a first force on the valve element during a first predetermined travel distance from the second position and a second force on the valve element during a second predetermined travel distance. The first force is greater than the second force.

20 Claims, 4 Drawing Sheets

ELECTROMAGNETIC CONTROL VALVE

TECHNICAL FIELD

The present invention is directed to an electromagnetic control valve and, more particularly, to an electromagnetic control valve for a fuel injector.

BACKGROUND

Electromagnetic valves are often used in applications that require precise control over a flow of fluid. An electromagnetic control valve typically includes a solenoid that is connected to a valve element, such as, for example, a poppet valve. The solenoid may be energized to move the valve element into and out of engagement with a valve seat to thereby regulate the flow of fluid through the valve. The electromagnetic properties of the solenoid may allow precise control over the position of the valve element relative to the valve seat and, thus, the flow of fluid through the valve. Accordingly, these types of control valves are well suited for use in applications that require precise control over the amount and/or timing of a flow of fluid.

For example, a fuel injector for an internal combustion engine may include an electromagnetic control valve that governs a fuel injection event. In one type of fuel injection system, the control valve is placed in fluid connection with a chamber in a fuel injector body. A cam is used to move a piston in the fuel injector body to exert a force on fuel provided to the chamber. When the control valve is open, the force of the piston acts to move fuel from the chamber through the control valve. Closing the control valve prevents fuel from escaping the chamber and allows the force of the piston to increase the pressure of the fuel. When the fuel reaches an injection pressure, a nozzle valve opens to inject the fuel into a combustion chamber. The fuel injection ends when the control valve opens to thereby allow fuel to escape from the chamber.

To precisely control the fuel injection event, the control valve should move quickly between the open and closed positions. Due to the high pressure of the fuel, the valve element of the control valve may experience significant resistance when moving out of engagement with the valve seat. To quickly overcome the resistance to opening, the control valve may include a device to assist in the opening of the valve.

An example of a device for assisting in the opening of the valve is described in U.S. Pat. No. 6,029,682 to Lewis et al. The described device includes a heavy return spring that is compressed when a solenoid moves the valve element into engagement with the valve seat. When the solenoid is de-energized, the heavy return spring acts to move a coupling member into contact with the valve element to assist in the opening of the control valve. However, after the connecting member impacts the valve element, only a timing spring with a lighter force acts on the valve element to continue moving the valve element to open the control valve.

Typically the force of the timing spring is significantly less than the force of the return spring, which allows the valve to be closed quickly. However, when the valve is opening, forces exerted by the pressurized fuel may overcome the force of the timing spring. This may temporarily delay full opening of the valve. Any delay in the opening of the control valve may cause an undesirable pressure fluctuation or pressure "shelf" in the fuel injection pressure. Any delay in the opening of the control valve may, therefore, result in an unpredictable fuel injection event, which may impact the operation of the engine.

The electromagnetic control valve of the present invention solves one or more of the problems set forth above.

SUMMARY OF THE INVENTION

One aspect of the present invention is directed to an electromagnetic control valve. The control valve includes a housing defining a bore and a fluid passageway having a seat. A valve element is slidably disposed in the bore and is moveable between a first position where a flow of fluid passes by the seat and a second position where a flow of fluid relative to the seat is blocked. A solenoid having an armature is operatively connected with the valve element. The solenoid is operable to move the valve element from the first position to the second position. A biasing assembly is operatively engaged with the valve element and is adapted to move the valve element from the second position towards the first position. The biasing assembly exerts a first force on the valve element during a first predetermined travel distance from the second position and a second force on the valve element during a second predetermined travel distance. The first force is greater than the second force.

In another aspect, the present invention is directed to a method of controlling an electromagnetic control valve. A solenoid is energized to move a valve element from a first position towards a second position to block a flow of fluid relative to the valve element. A biasing assembly is compressed as the valve element moves towards the second position. The solenoid is de-energized to thereby allow the biasing assembly to bias the valve element from the second position to the first position to allow a flow of fluid relative to the valve element. The biasing assembly exerts a first force on the valve element as the valve element moves a first predetermined travel distance, and the biasing assembly exerts a second force on the valve element as the valve element moves a second predetermined travel distance. The first force is greater than the second force.

It is to be understood that both the foregoing general description and the following detailed description are exemplary and explanatory only and are not restrictive of the invention, as claimed.

DETAILED DESCRIPTION

Figure 1:
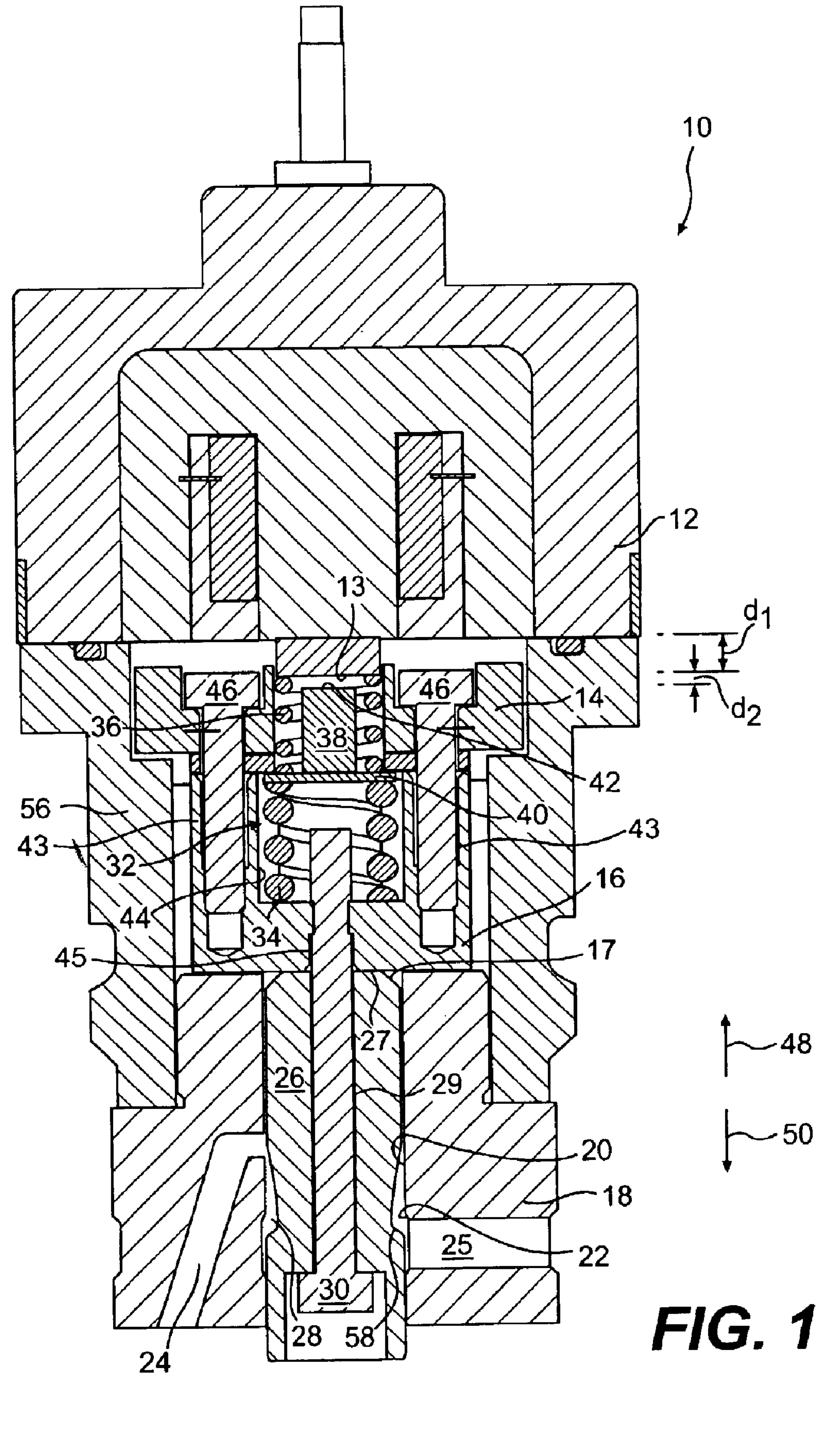
FIG. 1 is a diagrammatic cross-sectional view of a control valve according to an exemplary embodiment of the present invention, illustrating the control valve in a first position.

An exemplary embodiment of a control valve 10 is shown in FIG. 1. As shown, control valve 10 may include a housing 18 that defines a bore 20. Housing 18 may also define an inlet fluid passageway 24 that leads from an external surface of housing 18 to bore 20. Housing 18 may further define an outlet fluid passageway 25 that leads from bore 20 to an external surface of housing 18. Housing 18 may also include a seat 22 between inlet fluid passageway 24 and outlet fluid passageway 25.

A valve element 26 may be slidably disposed in bore 20 of housing 18. Valve element 26 may include a passageway 28 and a surface 58. Surface 58 may be adapted to engage seat 22 of housing 18. Passageway 28 is adapted to provide a fluid connection between inlet fluid passageway 24 and outlet fluid passageway 25 when surface 58 is removed from seat 22.

Figure 2:
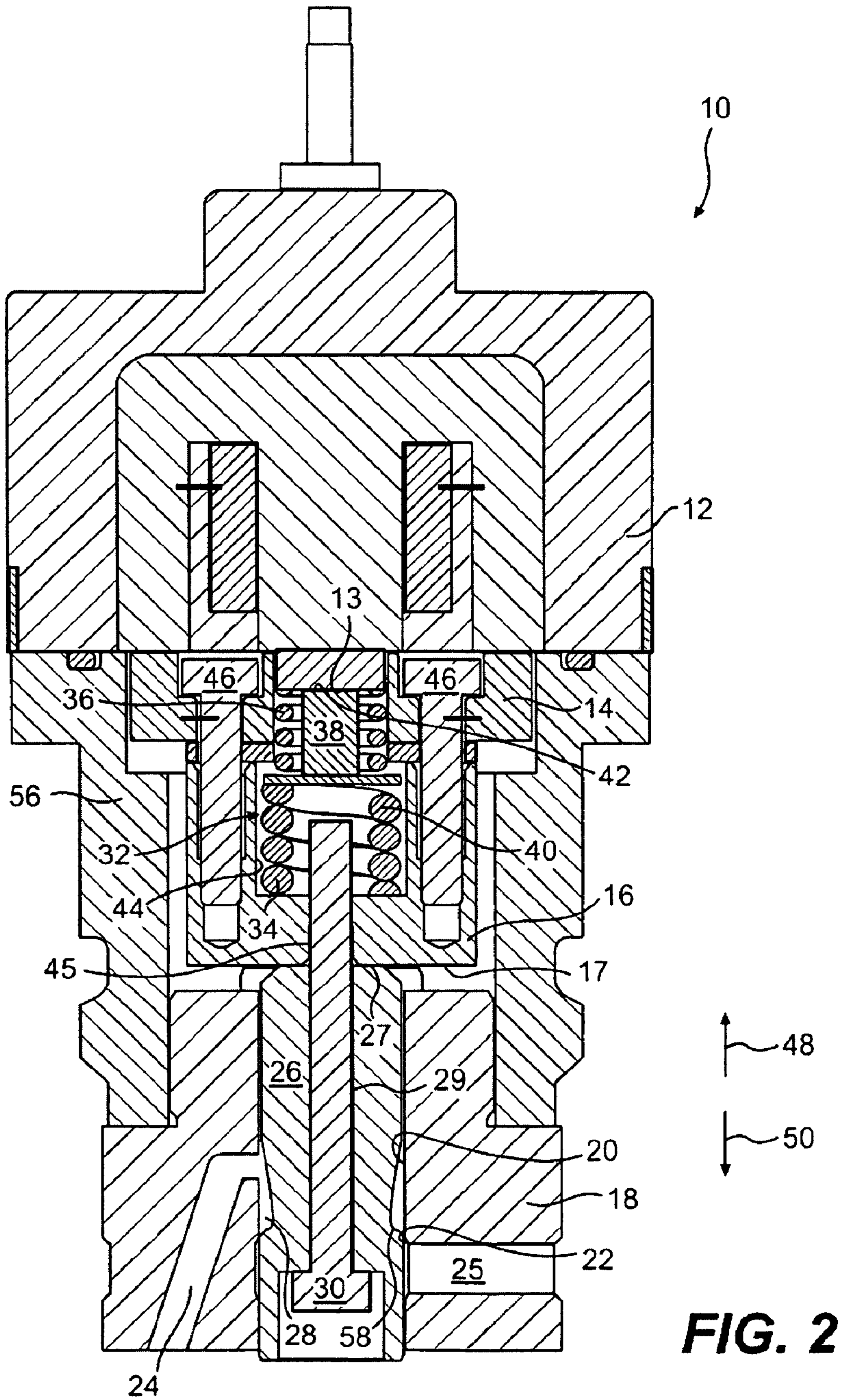
FIG. 2 is a diagrammatic cross-sectional view of a control valve according to an exemplary embodiment of the present invention, illustrating the control valve in a second position.

Valve element 26 may be moved between a first position and a second position. In the first position, as illustrated in FIG. 1, surface 58 is removed from seat 22 and fluid is allowed to flow from inlet passageway 24 through passageway 28 in valve element 26 to outlet fluid passageway 25. In the second position, as illustrated in FIG. 2, surface 58 engages seat 22 to close passageway 28 and thereby prevent fluid from flowing from inlet fluid passageway 24 to outlet fluid passageway 25.

Control valve 10 may include a solenoid 12 that is separated from housing 18 by a body 56. Solenoid 12 includes an armature 14 that is operatively connected to valve element 26. For example, a spacing member 16 may be operatively connected between armature 14 and valve element 26. Spacing member 16 may include a surface 17 that engages a surface 27 of valve element 26. One skilled in the art will recognize that armature 14 of solenoid 12 may be connected with valve element 26 in many different ways.

In the illustrated exemplary embodiment, spacing member 16 includes a series of openings 43 and 45. One or more fastening members 46 may be disposed through armature 14 to engage openings 43 in spacing member 16 and fixedly secure armature 14 to spacing member 16, as shown in FIG. 1. Another fastening member 30 may be disposed through a bore 29 in valve element 26 to engage opening 45 in spacing member 16 to fixedly secure valve element 26 to spacing member 16, as shown in FIG. 1. One skilled in the art will recognize that spacing member 16 may be connected between armature 14 and valve element 26 in many different ways.

Solenoid 12 may be operated to move armature 14 and connected spacing member 16 and valve element 26 from the first position towards the second position. Solenoid 12 may be controlled in any manner readily apparent to one skilled in the art, such as through electrical signals generated by a control device. For example, a computer or microprocesser may cause an electric current to be applied to solenoid 12. The application of the electric current energizes solenoid 12 and generates a magnetic field that causes armature 14 to move in the direction indicated by arrow 48.

A biasing assembly 32 may be disposed between solenoid 12 and valve element 26. Biasing assembly 32 may be adapted to exert a variable force on valve element 26 as valve element 26 moves from the second position towards the first position. Biasing assembly 32 may include any means for biasing valve element 26, such as, for example, a variable rate spring, a combination of springs, or another similar device adapted to exert a variable force on valve element 26.

Figure 3:
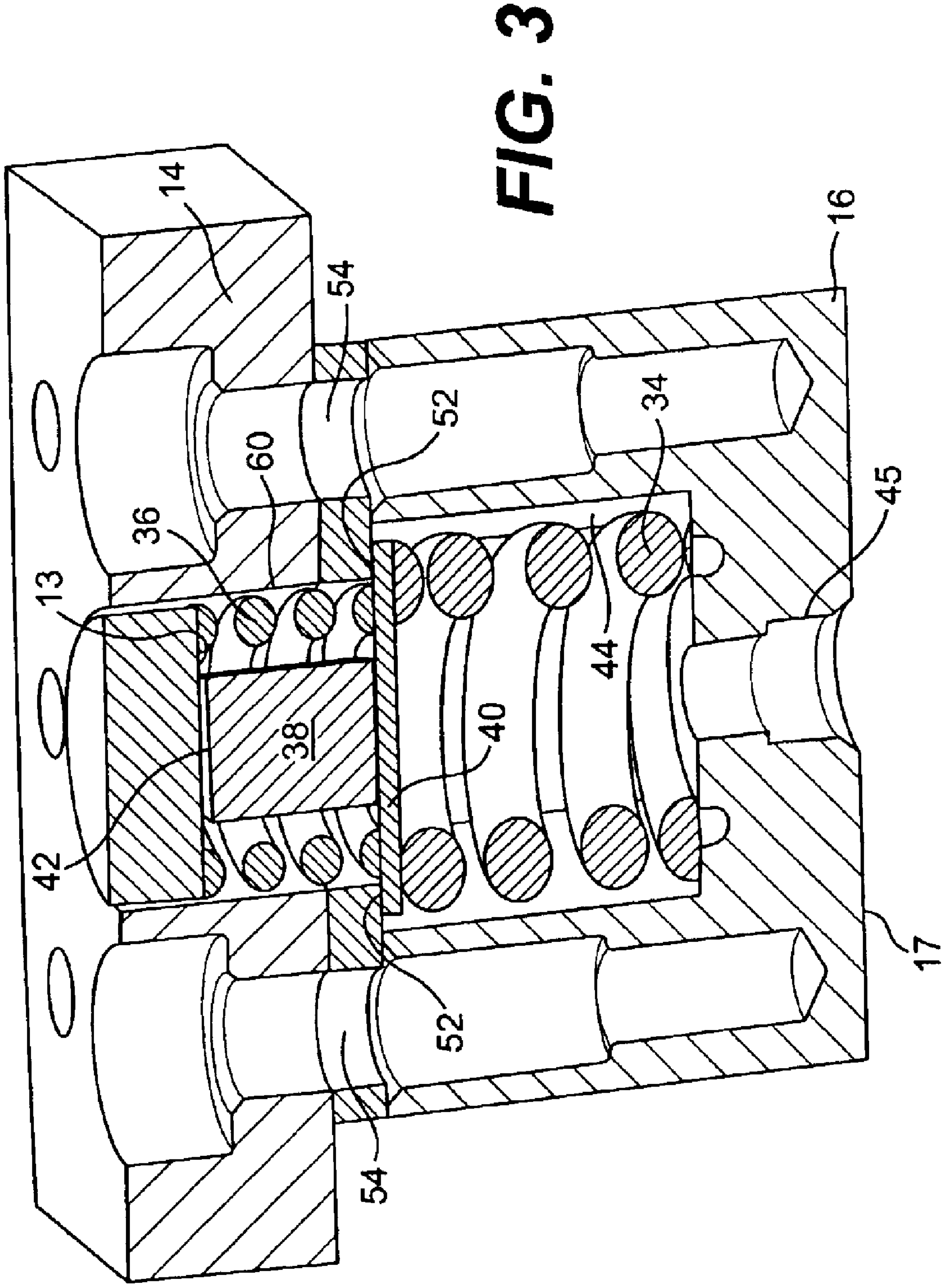
FIG. 3 is a partial diagrammatic cross-sectional view of a biasing assembly according to an exemplary embodiment of the present invention.

As illustrated in FIG. 3, biasing assembly 32 may include a first spring 34 and a second spring 36. First spring 34 is disposed within a bore 44 in spacing member 16 and is adapted to exert a first force. Second spring 36 is disposed in a bore 60 in spacing member 16 and is adapted to exert a second force. The first force may be substantially equal to or greater than the second force. Both first spring 34 and second spring 36 may be adapted to bias valve element 26 away from solenoid 12 in the direction indicated by arrow 50.

Biasing assembly 32 may also include an isolation member 38 that includes a plate member 40 and a pin member 42. Plate member 40 is disposed between first spring 34 and second spring 36. Pin member 42 extends through second spring 36 towards a surface 13 of solenoid 12. Surface 13 may extend a distance, $d_1$ (referring to FIG. 1), from solenoid 12. Surface 13 may be part of solenoid 12 or part of a spacing member that is connected to solenoid 12. Second spring 36 may bias pin member 42 to separate pin member 42 from surface 13 by a distance, $d_2$ (referring to FIG. 1).

A contact member 54 may be disposed between armature 14 and spacing member 16. Contact member 54 may include a shoulder 52. Shoulder 52 is adapted to engage plate member 40 of isolation member 38.

Figure 4:
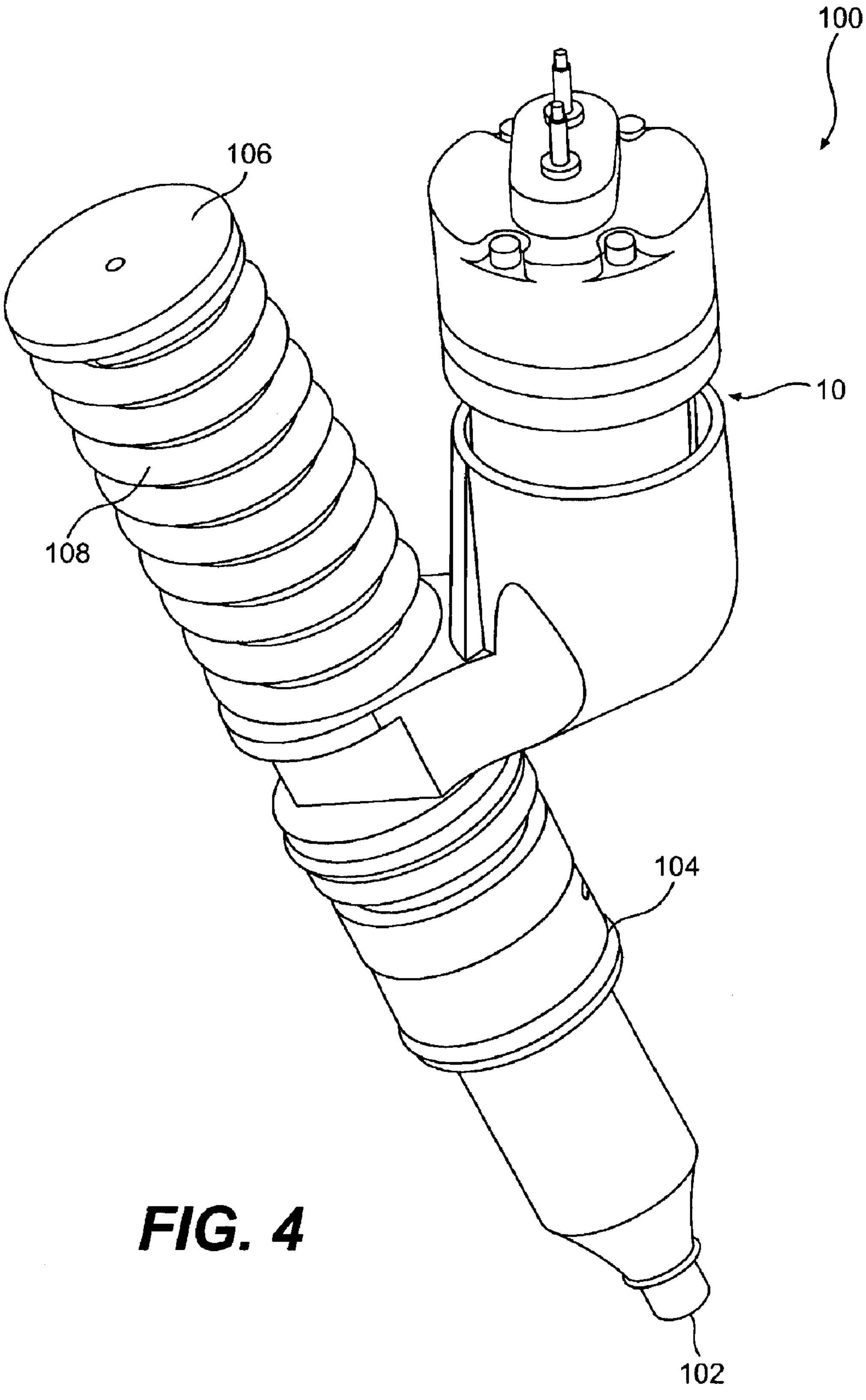
FIG. 4 is a pictorial representation of a fuel injector including a control valve according to an exemplary embodiment of the present invention.

As shown in FIG. 4, control valve 10 may be incorporated as part of a fuel injector 100. Control valve 10 may be adapted to control the rate of a flow of fuel from a chamber (not shown) in a fuel injector body 104. When valve element 26 (referring to FIGS. 1 and 2) is in the first position (as shown in FIG. 1), fuel is allowed to flow from the chamber in fuel injector body 104. When valve element 26 (referring to FIGS. 1 and 2) is in the second position (as shown in FIG. 2), fuel is prevented from flowing from the chamber in fuel injector body 104.

Fuel injector 100 may also include a piston 106 and a return spring 108. A cam (not shown) is adapted to move piston 106 to thereby apply a force to fuel in the chamber of fuel injector body 104. When valve element 26 is in the first position, the force on the fuel causes the fuel to flow from the chamber through control valve 10. When valve element 26 is moved to the second position, the fuel is prevented from flowing from chamber and the force of piston acts to increase the pressure of the fuel in the chamber. When the fuel in the chamber reaches an injection pressure, the fuel is injected through a nozzle 102 to a combustion chamber (not shown).

INDUSTRIAL APPLICABILITY

Control valve 10 may be operated to govern, for example, a fuel injection event for fuel injector 100. A flow of fuel may be provided to fuel injector body 104, such as for example, from a fuel supply rail. The flow of fuel may be directed into fuel injector body 104 and through a passageway in fuel injector body 104 that leads to inlet fluid passageway 24 of control valve 10.

Valve element 26 of control valve 10 is normally biased by second spring 36 into a first position, as shown in FIG. 1. In this position, surface 58 of valve element 26 is removed from seat 22 of housing. Thus, fuel may flow from inlet fluid passageway 24 through fluid passageway 28 of valve element 26 to outlet fluid passageway 25.

A cam (not shown) that is adapted to engage piston 106 (referring to FIG. 4) rotates to thereby move piston 106. The movement of piston 106 results in the exertion of a force on the fuel in fuel injector body 104. When valve element 26 is in the first position to allow fluid to flow to outlet fluid passageway 25, the force on the fuel in fuel injector body 104 causes the fuel to pass through control valve 10.

A fuel injection event may be initiated by energizing solenoid 12. The energized solenoid 12 generates a magnetic field that acts to move armature 14, and connected spacing member 16 and valve element 26, in the direction of arrow 48. The initial movement of spacing member 16 and valve element 26 acts to compress second spring 36 and moves surface 58 of valve element 26 towards seat 22.

The movement of spacing member 16 and corresponding compression of second spring 36 also causes isolation member 38 to move towards solenoid 12. The engagement of pin member 42 of isolation member 38 with surface 13 of solenoid 12 will prevent further compression of second spring 36. A continued movement of spacing member 16 relative to isolation member 38 will cause first spring 34 to compress and cause plate member 40 to lift from the respective surface of spacing member 16. Spacing member 16 will continue to move in the direction of arrow 48 until surface 58 of valve element 26 reaches the second position (as shown in FIG. 2) and engages seat 22 to thereby block the flow of fuel through control valve 10.

When the flow of fuel through control valve 10 is blocked, the force exerted by piston 106 acts to increase the pressure of the fuel in the chamber of the injector body 104 (referring to FIG. 4). When the pressure of the fuel reaches a predetermined injection pressure, the fuel is released through nozzle 102. In this manner, fuel may be injected into, for example, a combustion chamber.

To end the fuel injection event, solenoid 12 is de-energized. When the electric current to solenoid 12 is removed, the magnetic field will dissipate. Biasing assembly 32 will act to return valve element 26 to the first position.

When the magnetic field generated by solenoid 12 dissipates, biasing assembly 32 will exert a first force on spacing member 16 and valve element 26 over a first travel distance. The first force will be generated by first spring 34 or by the combination of first and second springs 34 and 36. The first force will be exerted on spacing member 16 and valve element 26 until first spring 34 expands and plate member 40 of isolation member 38 engages spacing member 16. The spring rates of first and second springs 34 and 36 may be selected to ensure that the first force will be great enough to move valve element 26 from seat 22 under any operating conditions. In addition, biasing assembly 32 may be sized to ensure that the first force is exerted on spacing member 16 and valve element 26 until surface 58 of valve element 26 moves a certain distance from seat 22.

The movement of surface 58 of valve element 26 away from seat 22 opens passageway 28 in valve element 26. This allows fuel to flow from inlet fluid passageway 24 to outlet fluid passageway 25. This flow of fuel will decrease the pressure of the fuel in the chamber of fuel injector body 104 below the injection pressure and the fuel injection through nozzle 102 will end. Thus, de-energizing solenoid 12 will end the fuel injection event.

After first spring 34 is fully expanded, biasing assembly 32 will exert a second force on spacing member 16 to move valve element 26 through a second travel distance. The second force is substantially equivalent to the force of second spring 36. The second force acts to return valve element 26 to the first position, as shown in FIG. 1.

As will be apparent from the foregoing description, the disclosed apparatus provides a fast acting control valve that may be used in an application such as, for example, a fuel injection system. The disclosed valve exerts a first force on a valve element to unseat the valve element and move the valve element through a first travel distance. The force on the valve element is then reduced as the valve element continues to move to a fully opened position.

The disclosed control valve may be used in a variety of applications. For example, the control valve of the present invention may be used in an application that requires precise control over a flow of fluid. In addition, the disclosed control valve may be used in an application that requires rapid opening of the valve element and where the valve element may encounter resistance to opening.

It will be apparent to those skilled in the art that various modifications and variations can be made in the disclosed valve without departing from the scope of the invention. Other embodiments of the invention will be apparent to those skilled in the art from consideration of the specification and practice of the invention disclosed herein. It is intended that the specification and examples be considered as exemplary only, with a true scope of the invention being indicated by the following claims and their equivalents.

What is claimed is:

1. An electromagnetic control valve, comprising:

a housing defining a bore and a fluid passageway having a seat;

a valve element slidably disposed in the bore and moveable between a first position where a flow of fluid passes by the seat and a second position where a flow of fluid relative to the seat is blocked;

a solenoid having an armature fixedly secured with the valve element so as to move in unison with the valve element during the entire operation of the valve, the solenoid operable to move the valve element from the first position to the second position; and a biasing assembly operatively engaged with the valve element and adapted to move the valve element form the second position towards the first position, the biasing assembly exerting a first force on the valve element during a first predetermined travel distance from the second position and a second force on the valve element during a second predetermined travel distance, wherein the first force is greater than the second force.

2. The control valve of claim 1, wherein the biasing assembly includes a first spring and a second spring and wherein the first and second springs combine to exert the first force on the valve element over the first predetermined travel distance and the second spring acts to exert the second force on the valve element over the second predetermined travel distance.

3. The control valve of claim 2, wherein the biasing assembly includes an isolation member that is disposed between the first and second springs.

4. The control valve of claim 3, wherein the isolation member includes a plate member adapted to engage one end of the first spring and a pin member adapted to operatively engage a surface of the solenoid.

5. The control valve of claim 4, wherein the first predetermined travel distance is substantially equal to the distance between the pin member of the isolation member and the surface of the solenoid when the valve element is in the first position.

6. The control valve of claim 3, further including a spacing member operatively engaged between the armature of the solenoid and the valve element.

7. The control valve of claim 5, wherein the spacing member includes a bore adapted to receive at least a part of the biasing assembly.

8. The control valve of claim 1, wherein the biasing assembly includes a variable force spring adapted to exert the first force over the first predetermined travel distance from the second position and the second force over the second predetermined travel distance.

9. The control valve of claim 1, wherein the valve element is a poppet valve and the poppet valve includes a surface adapted to engage the seat of the housing when the poppet valve is in the second position.

10. An electromagnetic control valve, comprising:

a housing defining a bore and a fluid passageway having a seat;

a valve element slidably disposed in the bore and moveable between a first position where a flow of fluid passes by the seat and a second position where a flow of fluid relative to the seat is blocked;

a solenoid having an armature fixedly secured with the valve element so as to move in unison with the valve element during the entire operation of the valve, the solenoid operable to move the valve element from the first position to the second position; and a means for biasing the valve element from the second position towards the first position, the biasing means exerting a first force on the valve element during a first predetermined travel distance from the second position and a second force on the valve element during a second predetermined travel distance, wherein the first force is greater than the second force.

11. A method of controlling an electromagnetic control valve, comprising:

energizing a solenoid having an armature fixedly secured to a valve element so as to move in unison with the valve element during the entire operation of the valve, to move the valve element from a first position towards a second position to block a flow of fluid relative to the valve element;

compressing a biasing assembly as the valve element moves towards the second position; and de-energizing the solenoid to thereby allow the biasing assembly to bias the valve element from the second position to the first position to allow a flow of fluid relative to the valve element, the biasing assembly exerting a first force on the valve element as the valve element moves a first predetermined travel distance and the biasing assembly exerting a second force on the valve element as the valve element moves a second predetermined travel distance, wherein the first force is greater than the second force.

12. The method of claim 11, further including energizing and de-energizing the solenoid to control a flow of fluid through a fuel injector.

13. The method of claim 11, wherein the biasing assembly includes a first spring and a second spring separated by an isolation member.

14. A fuel injector, comprising:

an injector body having a nozzle, the injector body adapted to receive a flow of fluid to control an injection event;

a control valve adapted to control the flow of fluid to the injector body, the control valve including:

a housing defining a bore and a fluid passageway having a seat;

a valve element slidably disposed in the bore and moveable between a first position where a flow of fluid passes by the seat and a second position where a flow of fluid relative to the seat is blocked;

a solenoid having an armature fixedly secured with the valve element so as to move in unison with the valve element during the entire operation of the valve, the solenoid operable to move the valve element from the first position to the second position; and a biasing assembly operatively engaged with the valve element and adapted to move the valve element from the second position towards the first position, the biasing assembly exerting a first force on the valve element during a first predetermined travel distance from the second position and a second force on the valve element during a second predetermined travel distance, wherein the first force is greater than the second force.

15. The fuel injector of claim 14, wherein the biasing assembly includes a first spring and a second spring and wherein the first and second springs combine to exert the first force on the valve element over the first predetermined travel distance and the second spring acts to exert the second force on the valve element over the second predetermined travel distance.

16. The fuel injector of claim 15, wherein the biasing assembly includes an isolation member that is disposed between the first and second springs and a spacing member operatively engaged between the armature of the solenoid and the valve element.

17. The fuel injector of claim 16, wherein the isolation member includes a plate member adapted to engage one end of the first spring and a pin member adapted to operatively engage a surface of the solenoid.

18. The fuel injector of claim 17, wherein the first predetermined travel distance is substantially equal to the distance between the pin member of the isolation member and the surface of the solenoid when the valve element is in the first position.

19. The fuel injector of claim 16, wherein the spacing member includes a bore adapted to receive at least a part of the biasing assembly.

20. The fuel injector of claim 14, wherein the biasing assembly includes a variable force spring adapted to exert the first force over the first predetermined travel distance from the second position and the second force over the second predetermined travel distance.

* * * * *